M. WILDRICK.
MOBILE MOUNT FOR HEAVY ARTILLERY.
APPLICATION FILED FEB. 24, 1917.
1,311,786.
Patented July 29, 1919.
6 SHEETS—SHEET 4.
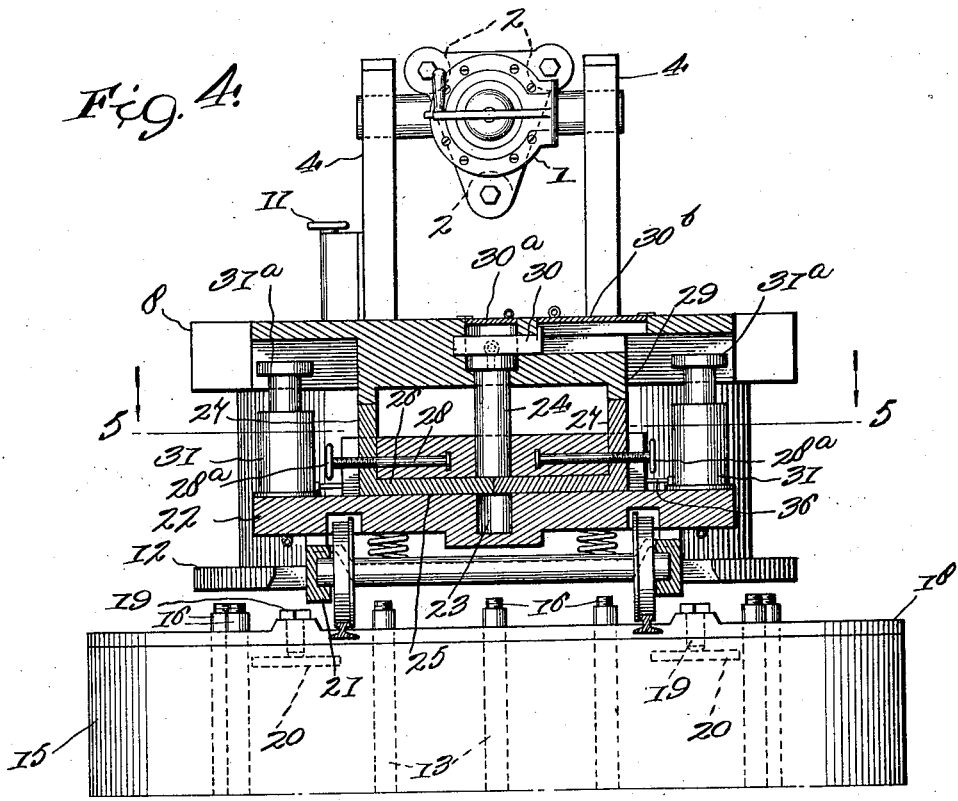
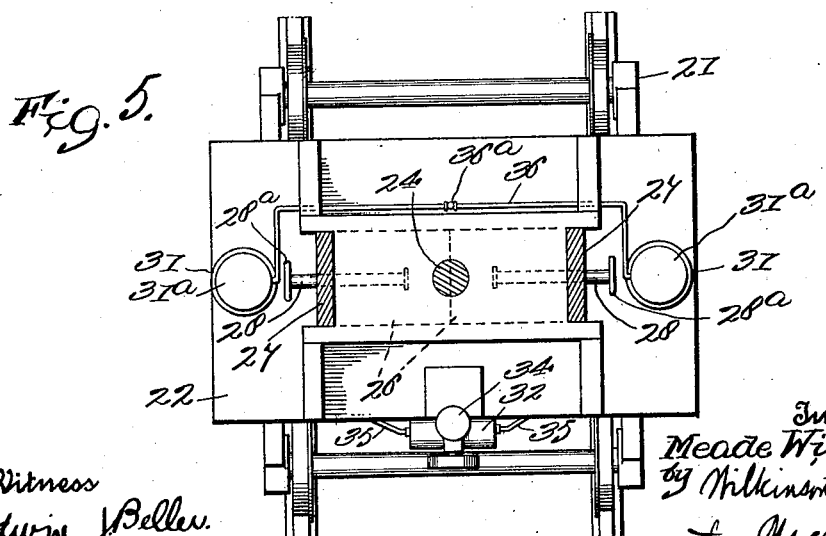

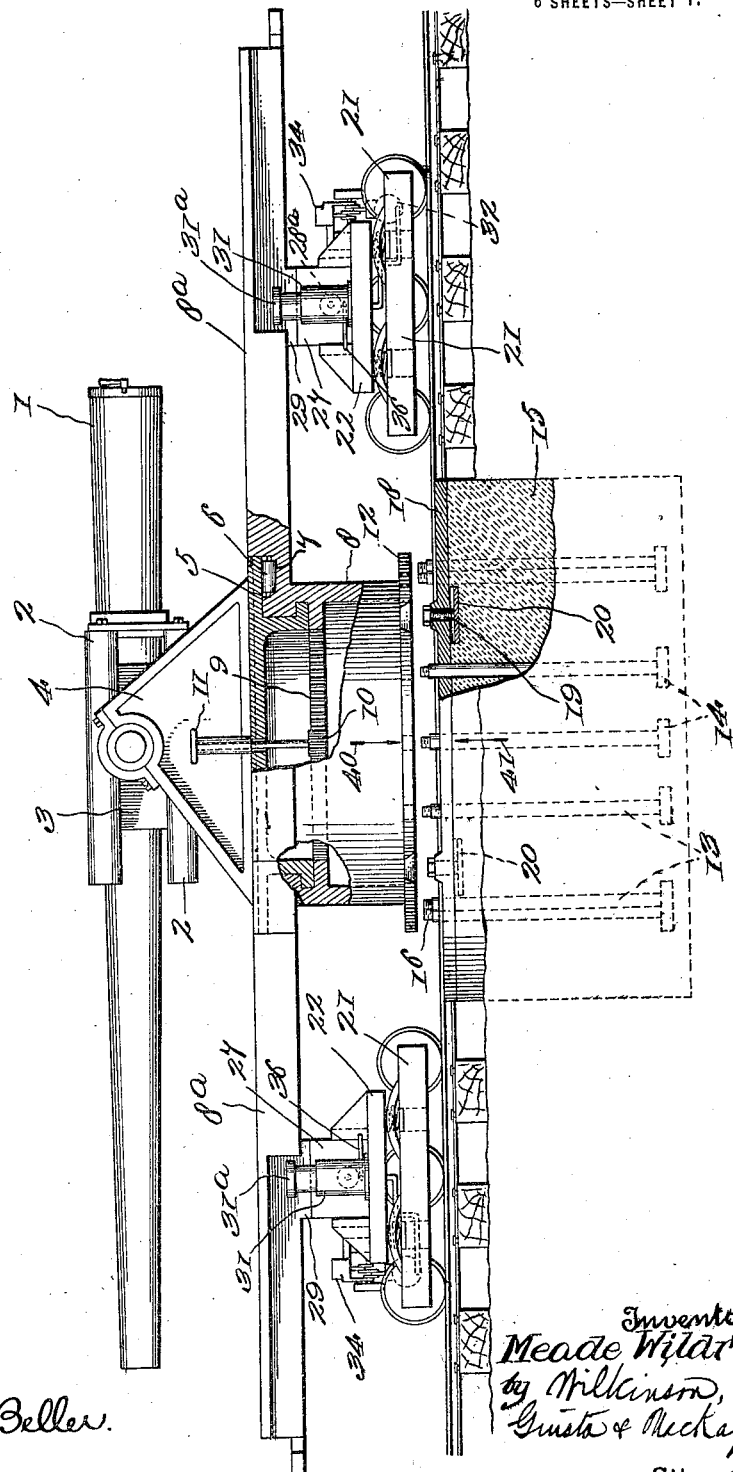

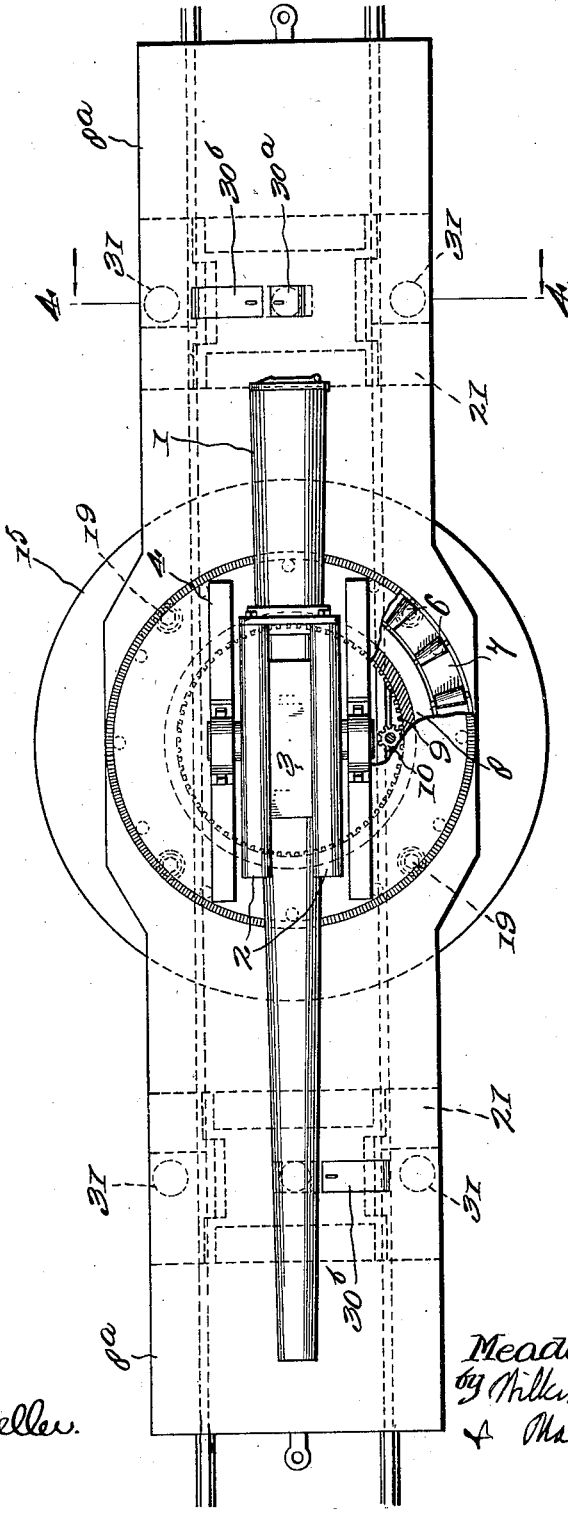

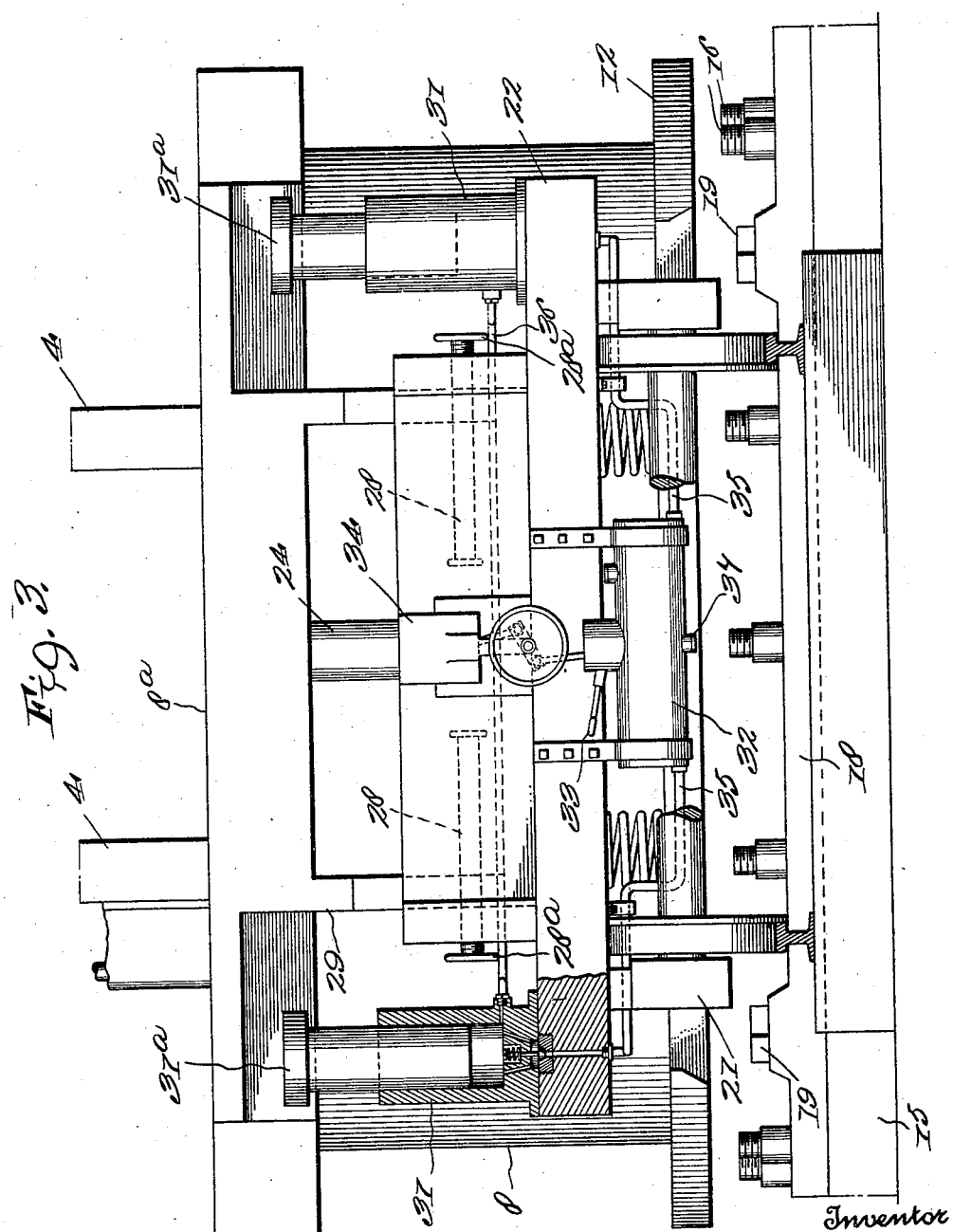

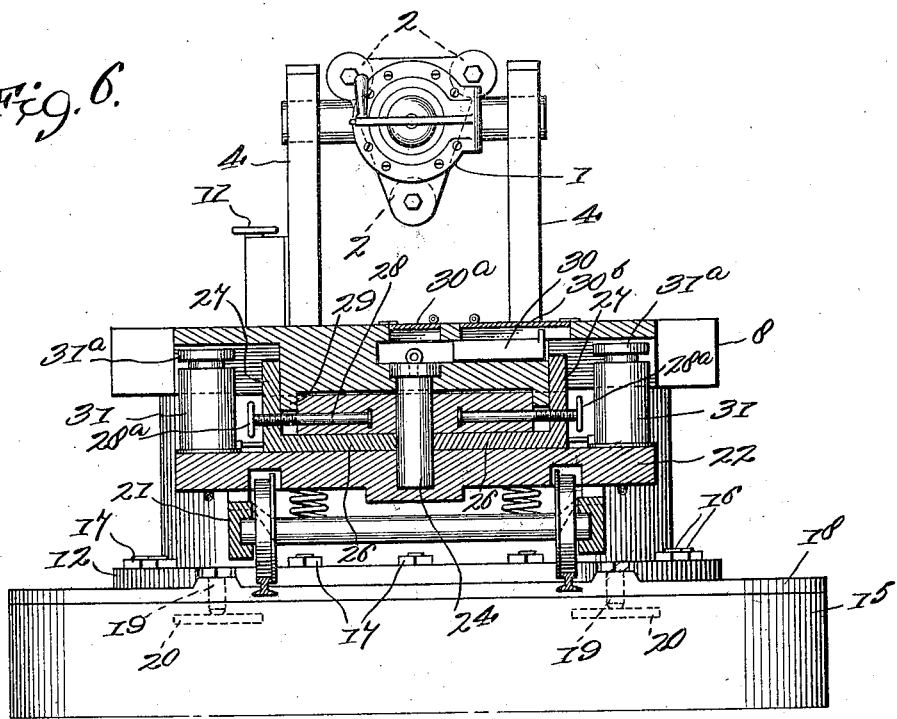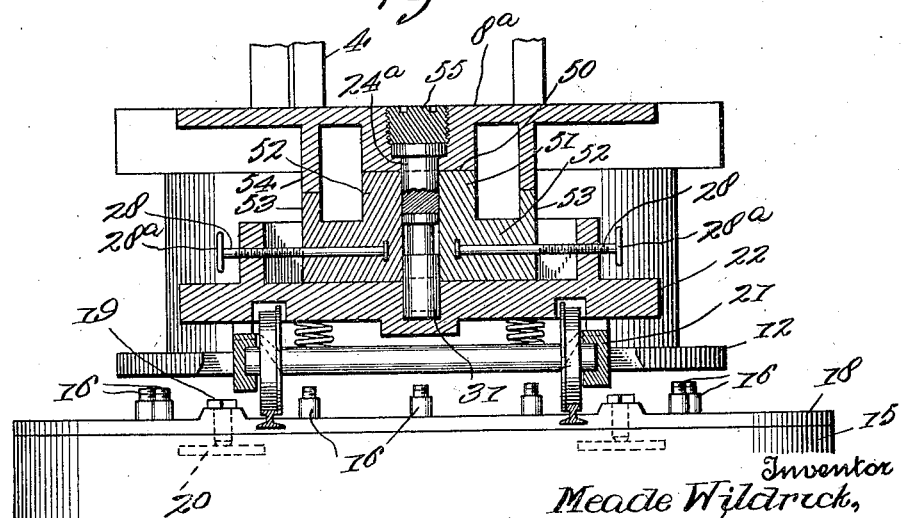

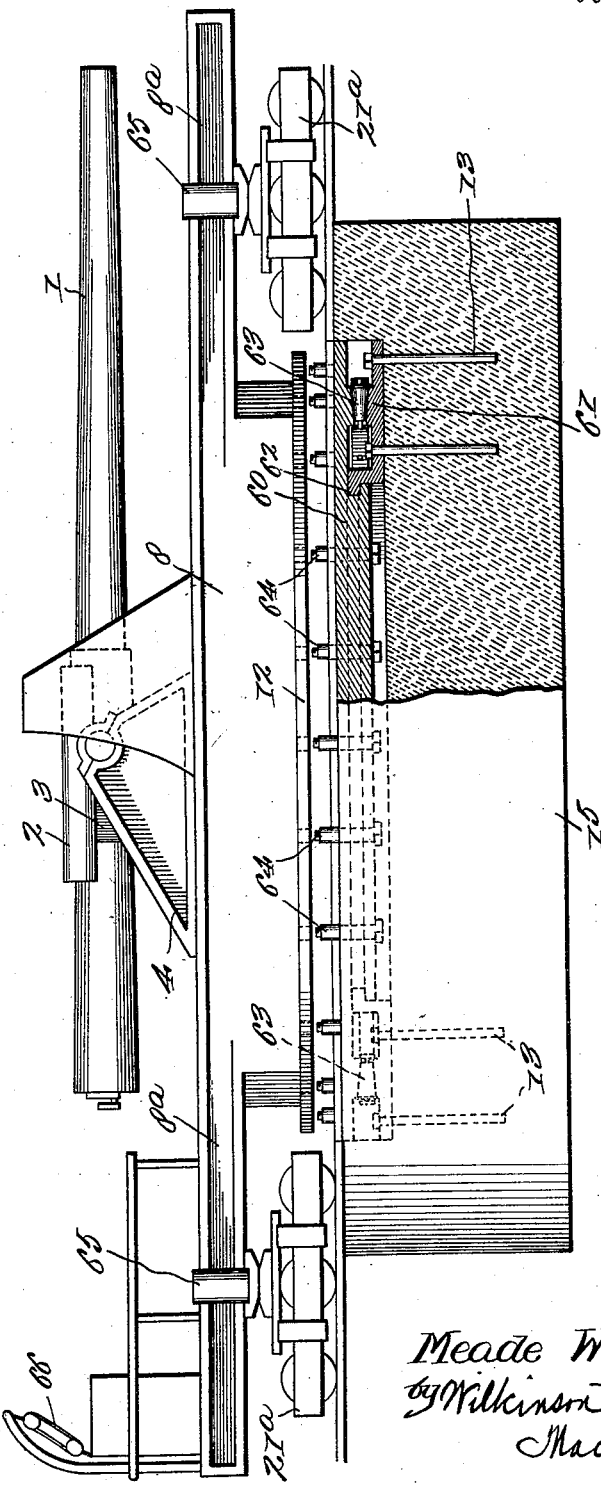

UNITED STATES PATENT OFFICE.

MEADE WILDRICK, OF THE UNITED STATES ARMY, ASSIGNOR OF ONE-HALF TO OSCAR I. STRAUB, OF FORT HOWARD, MARYLAND.

MOBILE MOUNT FOR HEAVY ARTILLERY.

1,311,786.  Specification of Letters Patent.  Patented July 29, 1919.

Application filed February 24, 1917. Serial No. 150,780.

*To all whom it may concern:*

Be it known that I, MEADE WILDRICK, of the United States Army, a citizen of the United States, stationed at Fort Monroe, in the county of Elizabeth City and State of Virginia, have invented certain new and useful Improvements in Mobile Mount for Heavy Artillery; and I do hereby declare the following to be a full, clear, and exact description of the invention, such as will enable others skilled in the art to which it appertains to make and use the same.

My present invention relates to improvements in mobile mounts for heavy artillery. It is eminently desirable that artillery should be readily transported from place to place, and properly and rapidly mounted as emergency may require.

According to my invention I have already prepared a series of emplacements at such place or places as may be deemed desirable, and then I provide a mobile mount adapted to be carried on a railway to any one or more of these emplacements, and there put into action as promptly as practicable.

It will be obvious that under certain conditions it will be eminently desirable to remove the mount from its original emplacement in as short a time as practicable, and my invention is especially intended to provide a mount which may be readily applied to, or removed from, any of one or more emplacements.

My invention will be more fully understood after reference to the accompanying drawings, in which—

Figure 1 shows the gun in position for being applied to, or removed from, its emplacement, parts of the gun mount and of the emplacement being shown in section.

Fig. 2 is a plan view of the device shown in Fig. 1, parts of the racer being broken away to show the means for traversing the gun.

Fig. 3 is an end view on a larger scale of the gun mount and supporting trucks, parts being broken away for the sake of clearness in the drawings.

Fig. 4 is a similar view to Fig. 3, but shows a section along the line 4—4 of Fig. 2, and looking in the direction of the arrows, the gun mount being shown supported by the truck.

Fig. 5 shows a section along the line 5—5 of Fig. 4, and looking down, parts being shown in plan.

Fig. 6 is a similar view to Fig. 4, except that the gun mount is lowered, and all the weight of the same resting on the emplacement, the trucks being relieved of such weight.

Fig. 7 is a similar view to Figs. 4 and 6, but shows a modification in which a single hydraulic jack is used for each truck; and Fig. 8 shows a modification of the form of mount as used for guns of the heavier calibers.

Referring first to Figs. 1 to 6, 1 represents a piece of heavy artillery, which may be a mortar, howitzer, or high power gun, which is provided with suitable recoil cylinders 2 mounted in the usual sleeve 3, trunnioned on the chassis 4. This chassis is mounted on the racer 5 supported on the conical rollers 6 on the circular roller path 7, provided in the main carriage 8.

The racer is provided with a circular traversing rack 9, engaging the pinion 10 operated by one or more hand wheels 11.

The main carriage 8 is provided with a flange at its base 12, which is perforated to receive the anchor or securing bolts 13, whose bottoms are flanged as at 14 and they are embedded in the concrete base 15, while their tops are screw-threaded as at 16 to receive the securing nuts 17.

The main carriage 8, when in the firing position, rests on a bed-plate 18, which is mounted above the concrete base 15. In order that this bed-plate 18 may be set level, I provide a series of leveling screws 19, which engage supporting plates 20 resting on top of the concrete base 15, as shown in Fig. 1. These supporting plates 20 may be made in wedge form if desired, and adjustment may be secured by driving same in, or by screwing up or down on the adjusting screws 19.

The main carriage 8 is provided with oppositely-disposed loading platforms 8ª, which also serve as supporting frames, by which the main carriage is supported on the trucks 21. When in the position for transport, there is one truck 21 at each end of the mobile mount, which supports same as will be hereinafter described.

These trucks are provided with a main platform 22, perforated as at 23 to receive the pintle 24 connecting each end of the main carriage with its corresponding truck. The main platform 22 is slotted as at 25 to receive the L-shaped sliding locking members 26, each of which locking members has a vertical web 27 engaging the screw bolt 28, which is operated by the hand wheel 28ª.

These vertical webs 27 have a very slight clearance from the ribs 29 on the main carriage, so that the main carriage will have very little lateral play while being transported, the weight of the main carriage being taken on the pintles 24, which are held in the engaging position by the locking bolts 30.

The main platform 22 of the truck also carries hydraulic jacks 31, which may be operated either by hand or preferably by power, as shown in Fig. 3, where 32 represents a fluid reservoir to which fluid under pressure may be supplied either by the hand pump 33 or by the power pump 34. From this reservoir 32 the fluid is forced under pressure through the pipes 35 to the jacks 31. I have shown one jack on each side of the truck and the pressure pipe 36 connecting the two jacks on opposite sides of the truck. To relieve the pressure a relief valve 36ª is provided, as shown in Fig. 5. A drain pipe 37 is also provided to drain out the liquid from the reservoir 32, when desired.

When the gun mount is in the position for transport the hydraulic jacks are lowered to the position shown in Figs. 3 and 4; but when it is desired to raise or lower the carriage in the operation of mounting or dismounting the mount from its emplacement, the hydraulic jacks are put in operation and the weight of the carriage is caused to rest upon the jack heads 31ª, as will now be described.

Suppose the gun mount to be in the position for transportation, shown in Figs. 3 and 4, pump up the jacks and raise the gun carriage slightly so as to take its weight off the pintle and support it on the jack heads, then turn the hand wheels 28ª so as to cause the locking members 27 to move clear of the ribs 29 on the gun carriage, so that when the gun carriage is lowered these members 27 may project up into recesses provided at the side of the carriage, as shown in Fig. 6. After the carriage has been lifted and the locking members 27 have been moved outward, the carriage may be lowered on the emplacement and bolted in place, as shown in Fig. 6.

If desired to remove the trucks entirely from the carriage, lift the door 30ᵇ and pull back the locking bolt 30, open the door 30ª, and remove the pintle 24. The trucks carrying the locking members 27 and the jacks 31 may be now run entirely free of the gun carriage, and the gun may be traversed in any direction desired.

The securing bolts 13 in the emplacement are so arranged that when the gun carriage is centered above the same, the perforations in the flange 12 will register with the heads of the bolts when the gun carriage is lowered; and this is effected by having the track straight on either side of the emplacement and the rails secured to the top of the base plate in any convenient way. Then, in order to have the bolts register with the bolt holes, it will only be necessary to move the gun mount on the trucks until some point such as the arrow 40 on the gun carriage registers with the arrow 41 on the emplacement. This may be readily done by moving the trucks backward or forward through a slight distance on the track. Then the gun carriage may be lowered and may be securely attached to the emplacement by the bolts 13 and nuts 17, as already described.

In order to transport the gun from one emplacement to another, take off the nuts 17, run the trucks to the lifting position, shown in Fig. 1, if not already there, insert the pintles 24 and the bolts 30, operate the lifting jacks, move the members 26 back to the position shown in Fig. 4, by means of the screws 28 operated by the hand wheels 28ª, and then release the pressure on the jacks, when the weight of each end of the gun carriage will be taken by its corresponding pintle, and the parts will assume the position shown in Fig. 4, and the entire mount is in the position for transportation.

In Figs. 1 to 6, I have shown two pairs of hydraulic jacks, one mounted at each side of its corresponding truck; but instead of two jacks, a single jack may be used for each truck, as shown in Fig. 7, where each end 8ª of the gun mount is provided with a bearing face 50, engaging the bearing face 51 of the movable blocks 52, which may be moved in or out by means of the screws 28 and hand wheels 28ª. Each of these blocks is provided with a rib 53, normally just free from engagement with the rib 54 on the lower face of the gun carriage. 31 represents a hydraulic jack operated in any convenient way, whose head bears against the pintle 24ª, which pintle passes through a slot in the carriage, which is closed by the screw block 55. To lift the carriage operate the jacks 31 until the weight at each end of the carriage is borne by its corresponding pintle 24ª, then move the blocks 51 outward until their upper bearings are clear from engagement with the bearing 50 and 51 on the carriage, at which time the two ends of the gun mount may be lowered so as to permit the carriage to rest on the emplacement, when it may be secured by the nuts 17 and the securing bolts 13, as previously described. The two trucks may be then run out of engagement, if desired, and the gun carriage may be traversed as before.

While I have shown the racer as mounted above the main gun carriage, which is the preferred type of construction for intermediate caliber guns, where large calibers are used it might be desirable to put the racer beneath the carriage, which would enable a large size base ring to be used, as shown in Fig. 8, of the drawings, where 60 indicates the racer which is clipped to the base ring 61 by means of the clips 62 and rests on the traversing rollers 63. The carriage 8 in this case is secured to the racer by means of the fastening bolts 64, and the base ring 61 is secured to the concrete base by means of the securing bolts 13, already described.

In Fig. 8 I have shown the hydraulic jacks 65 attached to the projecting ends 8$^a$ of the gun carriage and separate from the trucks 21$^a$. Since in this case the main carriage swings with the gun, the rear end of the carriage only will be used as a loading platform; and I have indicated diagrammatically the hoisting apparatus 66 for hoisting up the ammunition.

It will be noted that in all the forms of the device, the weight of the carriage is only supported by the jacks a short time incident to the brief time required to remove the gun from the trucks to the emplacement, or from the emplacement back to the trucks, as the case may be. During the time the gun is in transit, it is supported on the trucks; and while in action, it is supported by the emplacement.

It will also be noted that the jacks are only used for temporarily lifting the gun while temporarily supporting same in the raised position, while gravity causes the parts to assume the normal position when the pressure on the jacks is relieved.

It will also be noted that whether the trucks be removed or allowed to remain under the carriage, all the recoil is taken by the recoil cylinders and counter recoil springs and concrete base, and no recoil whatever is taken up by the trucks or the railroad track.

I do not mean to claim any special type of hydraulic jack to be used in connection with the invention as there are many suitable types, well known in the art, which may be operated either by power or by hand; but for quick results power-operated jacks would be preferable.

It will be obvious that various modifications might be made in the herein described apparatus, and in the construction, combination and arrangement of parts, which could be used without departing from the spirit of my invention.

Having thus described my invention, what I claim and desire to secure by Letters Patent of the United States is:

1. The combination with a gun of a gun carriage provided with a downwardly projecting central portion and raised ends projecting forward and rearward, of trucks adapted to pass beneath and support said raised ends of the carriage, and means for raising and lowering said carriage while supported on said trucks, substantially as described.

2. The combination with a gun of a gun carriage provided with a downwardly projecting central portion and raised ends projecting forward and rearward, of trucks adapted to pass beneath and support said raised ends of the carriage, and hydraulic jacks adapted to raise and lower said carriage while mounted on said trucks, substantially as described.

3. The combination with a gun of a gun carriage provided with a downwardly projecting central portion and raised ends projecting forward and rearward, of trucks adapted to pass beneath and support said raised ends of the carriage, and hydraulic jacks mounted on said trucks and adapted to raise and lower said carriage while still supported on said trucks, substantially as described.

4. The combination with a railway and trucks mounted thereon, of a gun carriage provided with a downwardly projecting central portion and raised ends projecting forward and rearward, said trucks being adapted to pass beneath and support said raised ends of the carriage, and means for raising and lowering said carriage while supported on said trucks, substantially as described.

5. The combination with a railway and trucks mounted thereon, of a gun carriage provided with a downwardly projecting central portion and raised ends projecting forward and rearward, said trucks being adapted to pass beneath and support said raised ends of the carriage, and hydraulic jacks adapted to raise and lower said carriage while mounted on said trucks, substantially as described.

6. The combination with an emplacement, of a gun, a gun carriage provided with a downwardly projecting central portion and raised ends projecting forward and rearward, of trucks adapted to pass beneath and support said raised ends of the carriage, means for raising and lowering said carriage while supported on said trucks, and means for detachably connecting said gun carriage to said emplacement when in the lowered position, substantially as described.

7. The combination with an emplacement, of a gun, a gun carriage provided with a downwardly projecting central portion and raised ends projecting forward and rearward, trucks adapted to pass beneath and support said raised ends of the carriage, hydraulic jacks adapted to raise and lower said carriage while mounted on said trucks, and means for detachably connecting said gun carriage to said emplacement when in the lowered position, substantially as described.

8. The combination with an emplacement, of a gun, a gun carriage provided with a downwardly projecting central portion and raised ends projecting forward and rearward, trucks adapted to pass beneath and support said raised ends of the carriage, means for raising and lowering said carriage while supported on said trucks, and securing bolts held firmly in said emplacement and having screw-threaded upper ends provided with nuts for detachably connecting said gun carriage to said emplacement when in the lowered position, substantially as described.

9. The combination with an emplacement, of a gun, a gun carriage provided with a downwardly projecting central portion and raised ends projecting forward and rearward, trucks adapted to pass beneath and support said raised ends of the carriage, hydraulic jacks adapted to raise and lower said carriage while mounted on said trucks, and securing bolts held firmly in said emplacement and having screw-threaded upper ends provided with nuts for detachably connecting said gun carriage to said emplacement when in the lowered position, substantially as described.

10. The combination with an emplacement provided with a concrete base and a bed-plate secured on the upper surface thereof, with means for leveling said bed-plate, and a gun, of a gun carriage provided with a downwardly-projecting central portion supported by said bed-plate, and also provided with raised ends projecting forward and rearward, of trucks adapted to pass beneath and support said raised ends of the carriage, and means for raising and lowering said carriage while supported on said trucks, substantially as described.

11. The combination with an emplacement provided with a concrete base and a bed-plate secured on the upper surface thereof, with means for leveling said bed-plate, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks adapted to raise and lower said carriage while mounted on said trucks, substantially as described.

12. The combination with an emplacement provided with a concrete base and a bed-plate secured on the upper surface thereof, with means for leveling said bed-plate, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks mounted on said trucks and adapted to raise and lower said carriage while still supported on said trucks, substantially as described.

13. The combination with an emplacement provided with a concrete base and a bed-plate secured on the upper surface thereof, with means for leveling said bed-plate, and a gun, of a gun carriage provided with a downwardly projecting central portion supported by said bed-plate, and also provided with raised ends projecting forward and rearward, of trucks adapted to pass beneath and support said raised ends of the carriage, and means for raising and lowering said carriage while supported on said trucks, with means for traversing the gun relative to said bed-plate, substantially as described.

14. The combination with an emplacement provided with a concrete base and a bed-plate secured on the upper surface thereof, with means for leveling said bed-plate, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks adapted to raise and lower said carriage while mounted on said trucks, with means for traversing the gun relative to said bed-plate, substantially as described.

15. The combination with an emplacement provided with a concrete base and a bed-plate secured on the upper surface thereof, with means for leveling said bed plate, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks mounted on said trucks and adapted to raise and lower said carriage while still supported on said trucks, with means for traversing the gun relative to said bed-plate, substantially as described.

16. The combination with an emplacement provided with a concrete base and a bed-plate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and means for raising and lowering said carriage while supported on said trucks, substantially as described.

17. The combination with an emplacement provided with a concrete base and a bedplate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks adapted to raise and lower said carriage while mounted on said trucks, substantially as described.

18. The combination with an emplacement provided with a concrete base and a bedplate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks mounted on said trucks and adapted to raise and lower said carriage while still supported on said trucks, substantially as described.

19. The combination with an emplacement provided with a concrete base and a bedplate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and means for raising and lowering said carriage while supported on said trucks, with means for traversing the gun relative to said bed-plate, substantially as described.

20. The combination with an emplacement provided with a concrete base and a bed-plate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks adapted to raise and lower said carriage while mounted on said trucks, with means for traversing the gun relative to said bed-plate, substantially as described.

21. The combination with an emplacement provided with a concrete base and a bed-plate secured on the upper surface thereof, and a gun, of a gun carriage provided with a downwardly projecting central portion supported by said bed-plate, and also provided with raised ends projecting forward and rearward, of trucks adapted to pass beneath and support said raised ends of the carriage, and hydraulic jacks mounted on said trucks and adapted to raise and lower said carriage while still supported on said trucks, with means for traversing the gun relative to said bed-plate, substantially as described.

In testimony whereof I affix my signature.

MEADE WILDRICK.

Copies of this patent may be obtained for five cents each, by addressing the "Commissioner of Patents, Washington, D. C."